United States Patent [19]

Tateishi

[11] 4,137,170
[45] Jan. 30, 1979

[54] TRAVELLING PRECIPITATE COLLECTOR

[75] Inventor: Yasuo Tateishi, Kumagaya, Japan

[73] Assignee: Hita Chi Metals, Ltd., Japan

[21] Appl. No.: 769,772

[22] Filed: Feb. 17, 1977

[30] Foreign Application Priority Data

Feb. 20, 1976 [JP] Japan .................................. 51/17060

[51] Int. Cl.² ............................................ B01D 21/20
[52] U.S. Cl. .................... 210/112; 210/526; 210/530; 210/531
[58] Field of Search .................. 210/86, 91, 90, 97, 210/112, 526, 527, 530, 531

[56] References Cited
U.S. PATENT DOCUMENTS

| | | | |
|---|---|---|---|
| 1,953,100 | 4/1934 | Blaisdell | 210/526 |
| 3,618,772 | 11/1971 | Dietrick | 210/97 X |
| 3,797,664 | 3/1974 | Pentz et al. | 210/112 X |

Primary Examiner—John Adee
Attorney, Agent, or Firm—Craig & Antonelli

[57] ABSTRACT

A travelling precipitate collector in which a transversely travelling frame is movably provided on a longitudinally travelling frame body, striding over a plurality of sedimentation basins and an elevating frame is vertically movably, interposedly provided in a machine frame which is fixed at the transversely travelling frame body and a chain installed with a plurality of buckets is circulated through the machine frame and the elevating frame, and further, a scraper and a pressure detector are installed on the elevating frame.

Owing to the above described structures, the travelling precipitate collector can be prevented defects which are caused from the precipitate clinging to a lower portion of the elevating frame and bending moment acting on the elevating frame can be detected and controlled to thereby protect component members.

23 Claims, 18 Drawing Figures

FIG. 9
FIG. 10
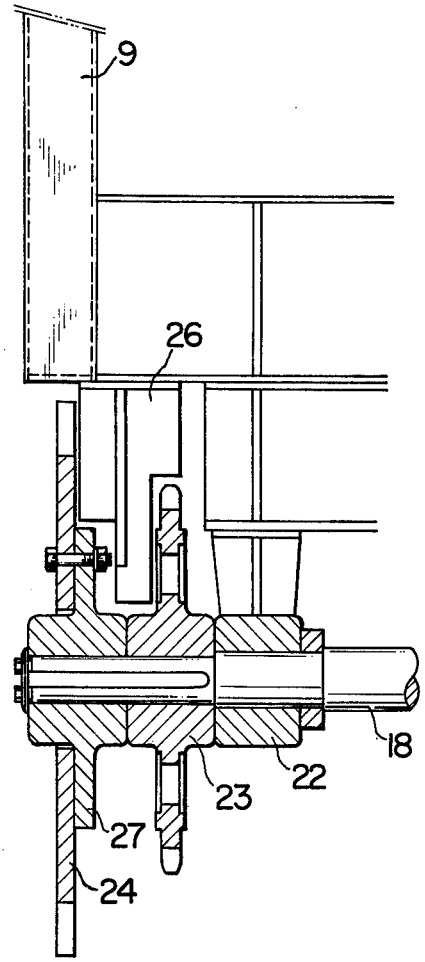
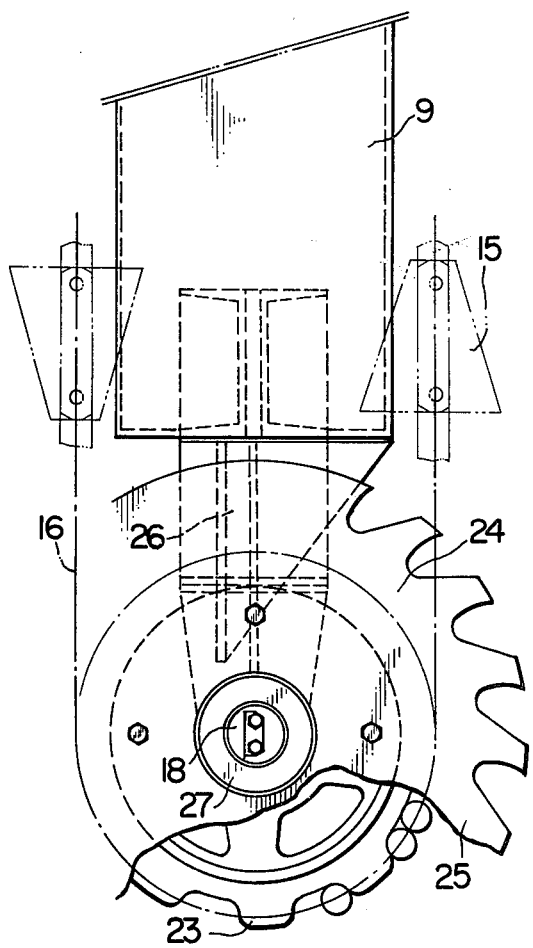

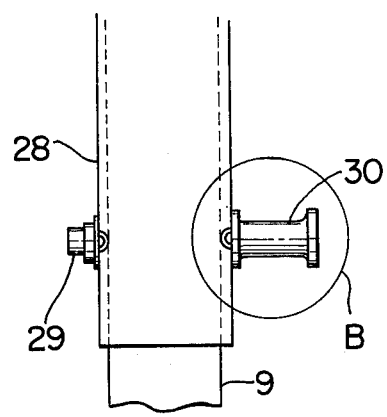
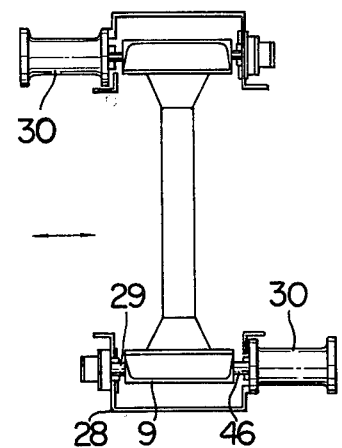
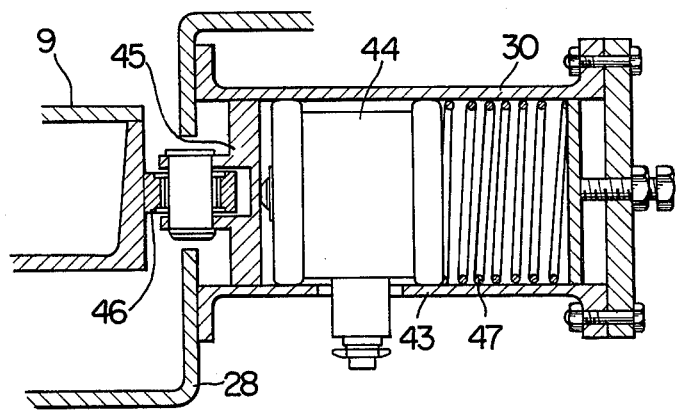

TRAVELLING PRECIPITATE COLLECTOR

This invention relates to precipitate collectors for continuously collecting precipitates such as sand, sludge, dust and the like which settled in sedimentation basins annexed to a waste water disposal facility or a drainage pumping facility, and more particularly to travelling precipitate collectors capable of travelling on sedimentation basins.

City sewage, industrial waste water or the like mixed with foreign matters such as sand, sludge, dust and the like, and if city sewage or waste water mixed with said foreign matters is directly poured out into a river, harbor or the like, then a considerable environmental pollution will be caused. Therefore, it is a common practice to precipitate and separate the foreign matters mixed in the waste water in sedimentation basins. Then, said precipitate which settled in sedimentation basins are intermittently or continuously collected, separated and extracted. As for devices used for the collection and separation of the foreign matters, recently there have extensively used travelling type devices in place of fixed type devices which had been used previously. The reasons are the increase of installed sedimentation basins in number, and necessity of meeting the requirement for dealing with a great number of sedimentation basins with a small number of devices by improving operation efficiency of devices.

One embodiment of travelling precipitate collector of the type described is shown in FIGS. 1 through 3. Referring to said drawings, a longitudinally travelling frame body 2 is movably provided through travelling means between the opposite banks of sedimentation basin 1, while striding over a plurality of sedimentation basins 1. Likewise, a transversely travelling frame body 3 is movably provided through travelling means on said longitudinally travelling frame body 2 in a manner that the former can travel over the total length of the latter. Next, a bucket elevator 4 is vertically movably provided on the transversely travelling frame body 3. The longitudinally travelling frame body 2 is provided over the total length thereof with a mounted conveyor 5 for conveying the precipitate, and a on-the-ground conveyor 6 is provided along one of the banks of said sedimentation basin 1. The discharging end of said mounted conveyor 5 is disposed over said on-the-ground conveyor 6 to thereby connect the conveyors 5 and 6 to each other. Additionally, said bucket elevator 4 and said mounted conveyor 5 are connected to each other through a chute 7 provided on the transversely travelling frame body 3.

To collect the precipitate which settled in said sedimentation basin 1 by use of said precipitate collector, it is necessary to go through the following steps. First, the bucket elevator 4 is elevated to the uppermost end, and thereafter the transversely travelling frame body 3 is moved to over a desired sedimentation basin 1, so that said bucket elevator 4 is disposed immediately over the sedimentation basin 1. Next, said bucket elevator 4 is lowered into the sedimentation basin 1 to collect the precipitate which will be conveyed by means of said chute 7, mounted conveyor 5 and on-the-ground conveyor 6. Thus, the whole precipitate in the sedimentation basin 1 is collected as the longitudinally travelling frame body 2 and transversely travelling frame body 3 are suitably moved around. In the case that collection of the precipitate in one sedimentation basin is completed, the bucket elevator 4 is elevated to the uppermost end and moved to over another sedimentation basin, thereby collecting the precipitate likewise.

Because even one unit of said precipitate collector can deal with a multiplicity of sedimentation basins, said precipitate collector is advantageous in respects of installation costs and operation efficiency. However, the bucket elevator 4 projects upwardly of the collector, and in particular, extremely projects when it is elevated to the uppermost end. Therefore, a relatively large space is required above the collector. In heavily populated areas such as cities, sedimentation basins are mostly provided indoors or in basements from the viewpoints of environmental sanitation and safety control. Hence, the spaces above the collectors are extremely limited, and it is almost impossible to install the collectors of the type described.

A collector shown in FIGS. 4 through 6 has been invented and used as an improved device for obviating the shortcomings described above (Japanese Utility Model Publication No. 5160/72). Same reference numerals as shown in FIGS. 1 through 3 are used to designate same or similar parts. Referring to FIGS. 4 through 6, designated at reference numeral 8 is a machine frame provided on the transversely travelling frame body 3. Vertically movably provided in said machine frame 8 is an elevating frame 9. Designated at 10 is elevating means provided on said machine frame 8. Said elevating frame 9 is vertically movably connected to the elevating means 10. Next, the machine frame 8 is horizontally movably provided thereon with tension wheels 11, and horizontally movable means 12 interposedly is provided so as to engage said tension wheels 11 to thereby constitute tension wheel stretching means. Designated at 13 are guide wheels provided on the machine frame 8. The elevating frame 9 is provided at the lower end thereof with a pair of chain wheels 14 secured to one and the same rotating shaft. A chain 16 fixedly provided at regular intervals thereon with buckets 15 is wound round said tension wheels 11, guide wheels 13 and chain wheels 14.

In the case that the precipitate in the sedimentation basin 1 is collected by use of said collector, the chain 16 fixedly provided with the buckets 15 should be driven. To collect and convey the precipitate, the travel of collector from one sedimentation basin to another and the like, the same steps as with the collector shown in FIGS. 1 through 3 should be gone through. However, with the collector shown in FIGS. 4 through 6, if the elevating frame is elevated in proportion to the accumulated volume of precipitate or at the time of travel of the collector from one sedimentation basin to another, then the chain 16 is slackened. Therefore, the horizontally movable means 12 is actuated to cause the tension wheels 11 to move horizontally, thereby enabling to maintain the stretched condition of the chain 16. The condition of the elevating frame 9 being at the uppermost end is shown in FIG. 6.

The precipitate collector of the type described should naturally possesses the same features as said travelling precipitate collector, at the same time, has such effect that the height of the collector in the space thereabove can be limited, and hence, is advantageously used as a collector dealing with sedimentation basins provided indoors or in basements.

However, the precipitate collector described above as well as the aforesaid travelling precipitate collector shown in FIGS. 1 through 3 are unsatisfactory in many respects. Namely, this fact is resulted from the arrangement of the lower end portion of the elevating frame. FIGS. 7 and 8 are respectively a longitudinal sectional view and a front view showing the arrangement of the lower end portion of the elevating frame of the conventional travelling precipitate collector shown in FIGS. 1 through 6. Referring to FIGS. 7 and 8, same reference numerals as shown in FIGS. 1 through 6 are used to designate same or similar parts. An elevating frame 9 is fixedly provided adjacent the lower end portion thereof with bearings 17 so as to have a rotating shaft 18 interposed therebetween. Said rotating shaft 18 is fixedly provided through a hub 19 with said pair of chain wheels 14, and a rake wheel 20 is fixedly provided through the hub 19 between the chain wheel 14 and the elevating frame 9. Rakes 21 are projectingly provided on the outer periphery of the rake wheel 20.

With the arrangement described above, the precipitate which settled at the bottom of said sedimentation basin 1 is cut and broken by the rakes 21 provided on the outer periphery of said rake wheel 20 rotated in the arrow-marked direction by the rotation of said rotating shaft 18 as shown in FIG. 8, and collected by the buckets 15 mounted on the chain 16. However, with the precipitate collector having the arrangement shown in FIGS. 7 and 8, in the case of collecting the precipitate, the precipitate such as dust and the like clings or is compressed and accumulated between the chain wheel 14 and the rake wheel 20, because the space is limited therebetween. As the result, meshing engagement between the chain wheel 14 and the chain 16 is hampered. As a consequence, both the chain wheel 14 and rake wheel 20 become unrotatable, and such problems are caused that the decrease in collecting capacity of buckets 15 due to the incapability of the rake wheel 20 in cutting or shaving the precipitate, and unsatisfactory running of the chain 16. To obviate shortcomings described above, such a measure can be thought of that a scraper for scraping the precipitate which has clinged is installed between the chain wheel 14 and the rake wheel 20. However, as apparent from FIG. 7, the gap therebetween is extremely narrow and therefore there is no allowance for a member such as a scraper to be interposed. Therefore, the lower end portion of the elevating frame 9 is held back by the precipitate accumulated due to said decrease in collecting capacity during the travel of collector, with the result that a large bending moment acts on the elevating frame 9. This results in deformation of the elevating frame 9 and slip of one side of the longitudinally travelling frame body 2 during the travel due to the resistance of the precipitate, thereby causing an oblique movement. Additionally, with the precipitate collector shown in FIGS. 4 through 6, the elevating frame 9 and the tension wheels 11 can be driven independently of each other, whereby said frame and wheels are allowed to be driven in proportion to load variations, respectively. If the balanced relative operations therebetween are broken, problems likely take place which include occurrence of unusual large loads, come-off of the chain, collision with the adjacent members due to the partial slackening of the chain, and the like.

An object of the present invention is to provide a travelling precipitate collector wherein the problems have been obviated which are resulted from the intrusion of the precipitate between the chain wheel and the rake wheel that are provided at the lower end of the elevating frame. Another object is to provide a precipitate collector wherein a bending moment acting on the elevating frame is properly detected to thereby protect the component members, and travelling means which is controllable for reducing bending moments which act on the component members are provided. A further object is to provide a travelling precipitate collector constructed such that the elevating means and the tension means operate in a relatively balanced condition with each other. A still further object is to provide a precipitate collector wherein the collecting member is easily mountable or removable in case of emergency or at the time of repair or inspection. A yet further object is to provide a precipitate collector capable of automatically adjustable travelling in proportion to the condition of the pecipitate accumulated.

The present invention is a travelling precipitate collector comprising: a longitudinally travelling frame body movably provided, striding over a plurality of sedimentation basins; a transversely travelling frame body movably provided on said longitudinally travelling frame body; an elevating frame vertically movably provided in a machine frame which is fixed on said transversely travelling frame body; and a chain circulating through said machine frame and elevating frame and fixedly provided thereon with a plurality of buckets; wherein at least one pressure detector is provided in a portion of said machine frame so as to abut against said elevating frame through urging means.

Furthermore, the present invention is a travelling precipitate collector wherein stretching means for the tension wheels and elevating means for the elevating frame that are to be engaged with said chain are provided on the machine frame, respectively, and said stretching means and elevating means are connected to common driving means.

FIGS. 9 and 10 are respectively a cross-sectional view and a side view showing the essential portions of the first embodiment of the present invention;

FIGS. 12 and 13 are respectively an enlarged side view and a sectional plan view showing the portion A in FIG. 11;

FIG. 14 is an enlarged sectional view showing the portion B in FIG. 12;

Figure 1:
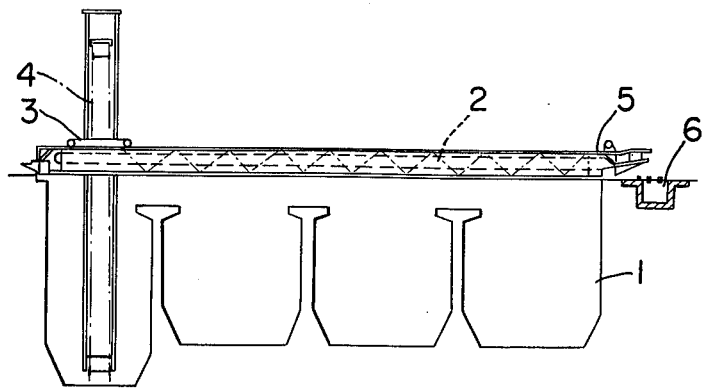
FIGS. 1 through 3 are respectively a front view, a plan view and a side view showing the conventional travelling precipitate collector.
Figure 2:
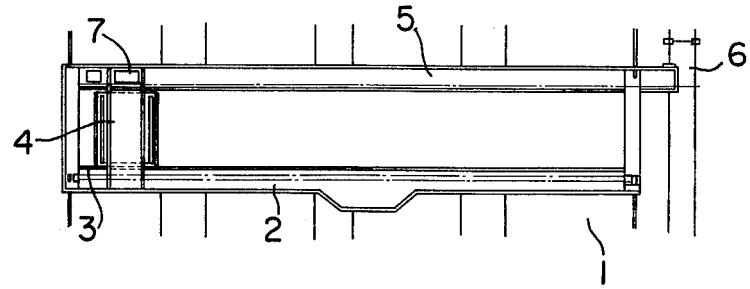
Figure 3:
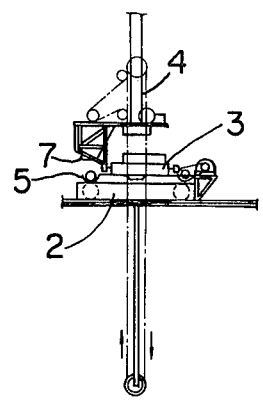

Description will hereunder be given of the preferred embodiments of the present invention with reference to the drawings. Referring to FIGS. 9 and 10, an elevating frame 9 is projectingly provided at the lower end thereof with a pair of bearings 22 through members. The bearings 22 are interposedly, rotatably provided with a rotating shaft. A chain wheel 23 and a rake wheel 24 are fixed on the opposite end portions of the rotating shaft 18, respectively. The rake wheel 24 is projectingly provided on the outer periphery thereof with rakes 25. Next, designated at 26 is a scraper projectingly provided at the lower end of the elevating frame 9 in a manner that the forward end thereof is interposed between the chain wheel 23 and the rake wheel 24. The chain wheel 23 and the rake wheel 24 are spaced apart at a comparatively large interval, and the outer end face of the rake wheel 24 is open without being blocked by the elevating frame 9. For this, the rake wheel 24 may be preferably fixed on the rotating shaft 18 through the medium of a hub 27 as shown in FIGS. 9 and 10.

Figure 4:
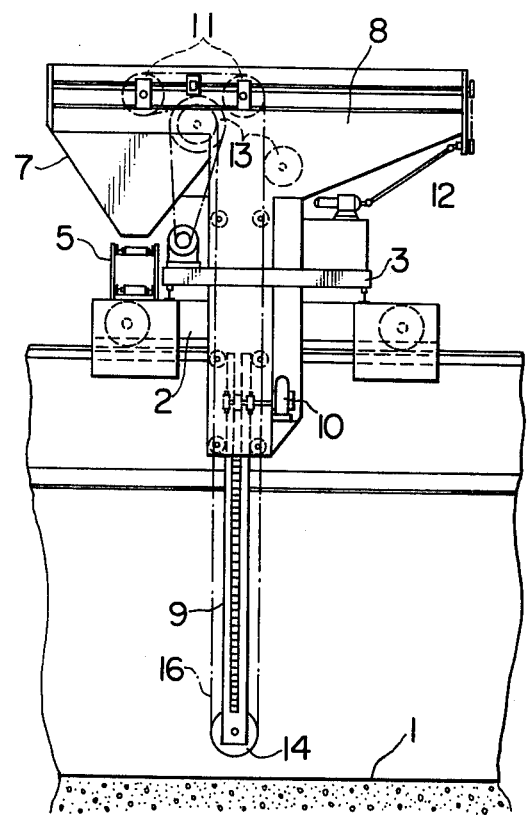
FIGS. 4 through 6 are respectively a side view and a front view showing another conventional travelling precipitate collector, and a side view showing one operating condition thereof.
Figure 5:
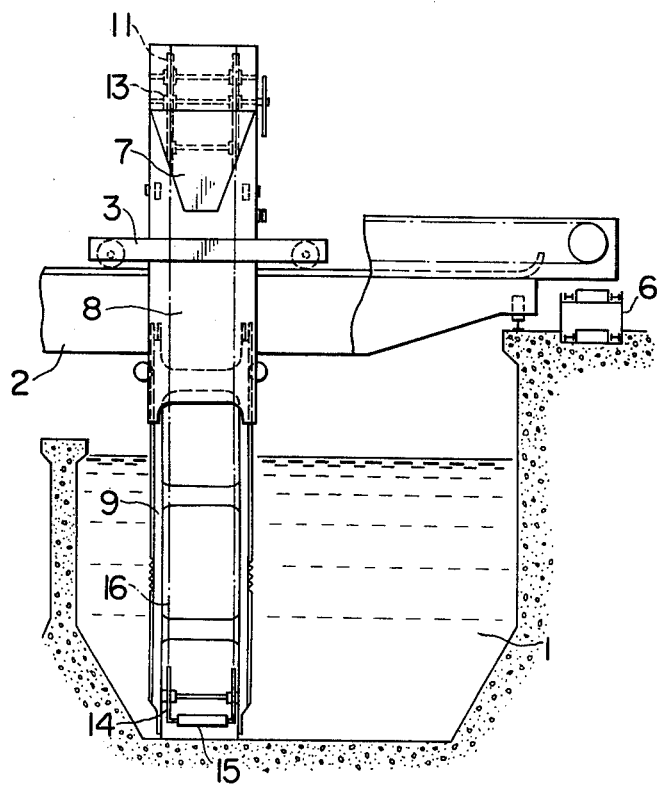
Figure 6:
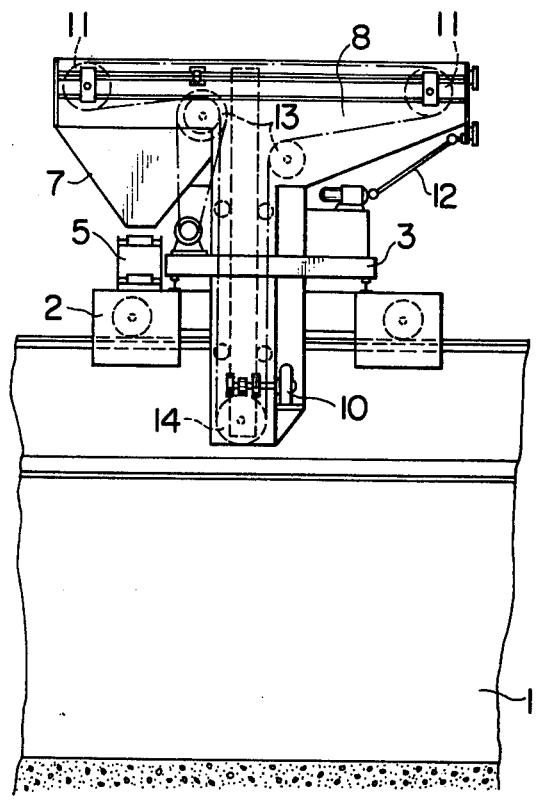
Figure 7:
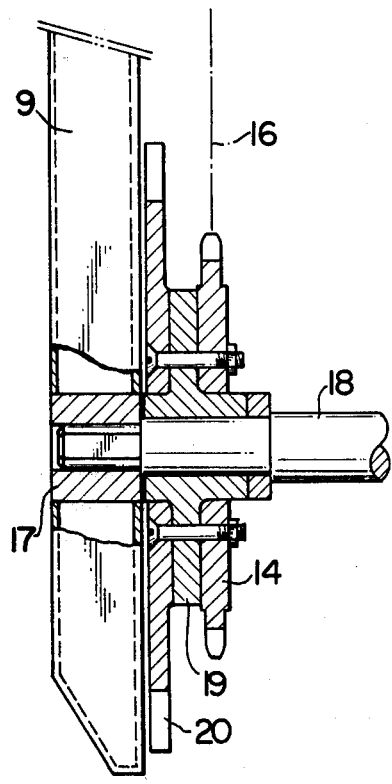
FIGS. 7 and 8 are respectively a cross-sectional view with essential portions being enlarged and a side view, illustrating the collectors shown in FIGS. 1 through 6.
Figure 8:
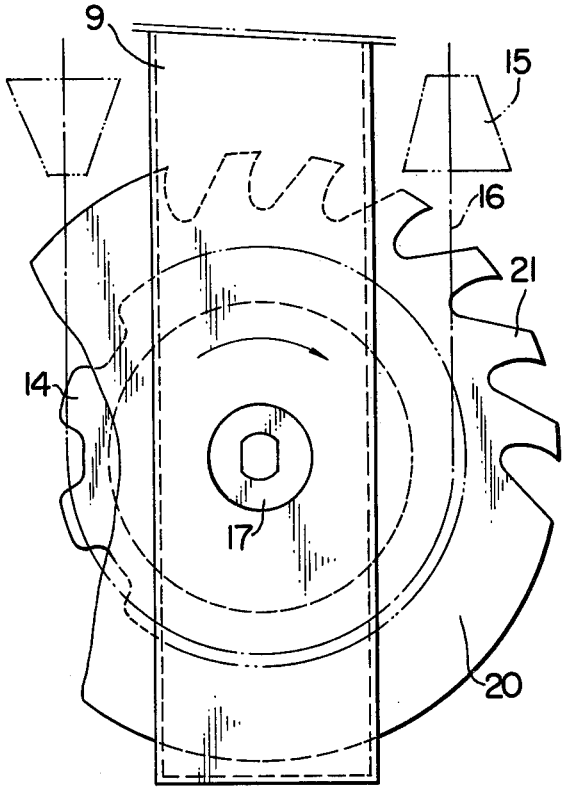

The precipitate which has settled in the sedimentation basin 1 can be collected by the operation of the travelling precipitate collector installed with the elevating frame 9 having the arrangement described above in the condition shown in FIGS. 4 and 5 for example. In this case, a portion of the precipitate accumulated in the sedimentation basin may cling between the chain wheel 23 and the rake wheel 24 that are shown in FIGS. 9 and 10. However, as apparent from both drawings, the chain wheel 23 and the rake wheel 24 can be spaced apart at a comparatively large interval because the rake wheel 24 is open outwardly and the bearing 22 is provided inwardly of the chain wheel 23. Consequently, the intrusion of precipitate is extremely limited and, if any, the precipitate may not stay for a long time. Furthermore, the scraper 26 projectingly provided in the space described above will substantially completely scrape and discharge the precipitate which has intruded.

Next, FIGS. 11 through 15 illustrate the second embodiment of the present invention. Same reference numerals as shown in FIGS. 4 through 10 are used to designate same or similar parts. First, referring to FIG. 11, a machine frame 28 is fixed at the lower portion of the transversely travelling frame body 3, and an elevating frame 9 is vertically movably, interposedly provided in said machine frame 28 through a guide roller 29. Designated at 30 is a pressure detector fixed on the machine frame 28. Said machine frame 28 is provided therein with elevating means comprising a rack 31 provided on the elevating frame 9 and a pinion 32, said rack and pinion being in meshing engagement. A chain 16 installed with a plurality of buckets at regular intervals is wound round a plurality of guide wheel 13, horizontally movable tension wheels 11 and a fixed drive wheel 33 all of which are provided on the machine frame 8, and connected to a rotary mechanism 34. Next, description will be given of the arrangement of horizontal movable means of tension wheels 11. One of the tension wheels 11 is coaxially, fixedly provided with a sheave 35, and the machine frame 8 is rotatably provided with a plurality of sheaves 36. A wire rope 37 secured at one end to the machine frame 8 is wound round said sheaves 35, 36. The other end portion of wire rope 37 is wound round a wire winding drum provided on the machine frame 8. Designated at 39 is an electric motor connected to the wire winding drum 38 and said elevating means 10 through the respective power transmitting means provided independently of each other. On the other hand, two horizontally movable tension wheels 11, 11 are connected to each other by a wire rope 41 provided in a letter 'U' shaped turn through a sheave 40 rotatably mounted on the machine frame 8. Designated at 42 are guide sheaves rotatably provided on the machine frame 8 between the tension wheels 11, 11 and around which is wound said wire rope 41. Designated at 48, 49 are travel driving means and a control panel, respectively.

Next, description will be given of the arrangement of said pressure detector 30 and therearound with reference to FIGS. 12 through 14. The elevating frame 9 is vertically movably provided in the machine frame 28 with the guide roller 29 being interposedly provided therebetween as aforesaid. On the other hand, the pressure detector 30 is solidly secured at a case 43 thereof to the machine frame 28, and said case 43 is couplingly, slidably provided therein with a pressure detecting element 44 and a roller support fitting 45. Designated at 46 is a guide roller. Said case 43 is confinedly provided therein with a spring 47 so that the pressure detecting element 44 can engage the elevating frame 9 through the support fitting 45 and the guide roller 46 in constantly compressed manner.

Figure 15:
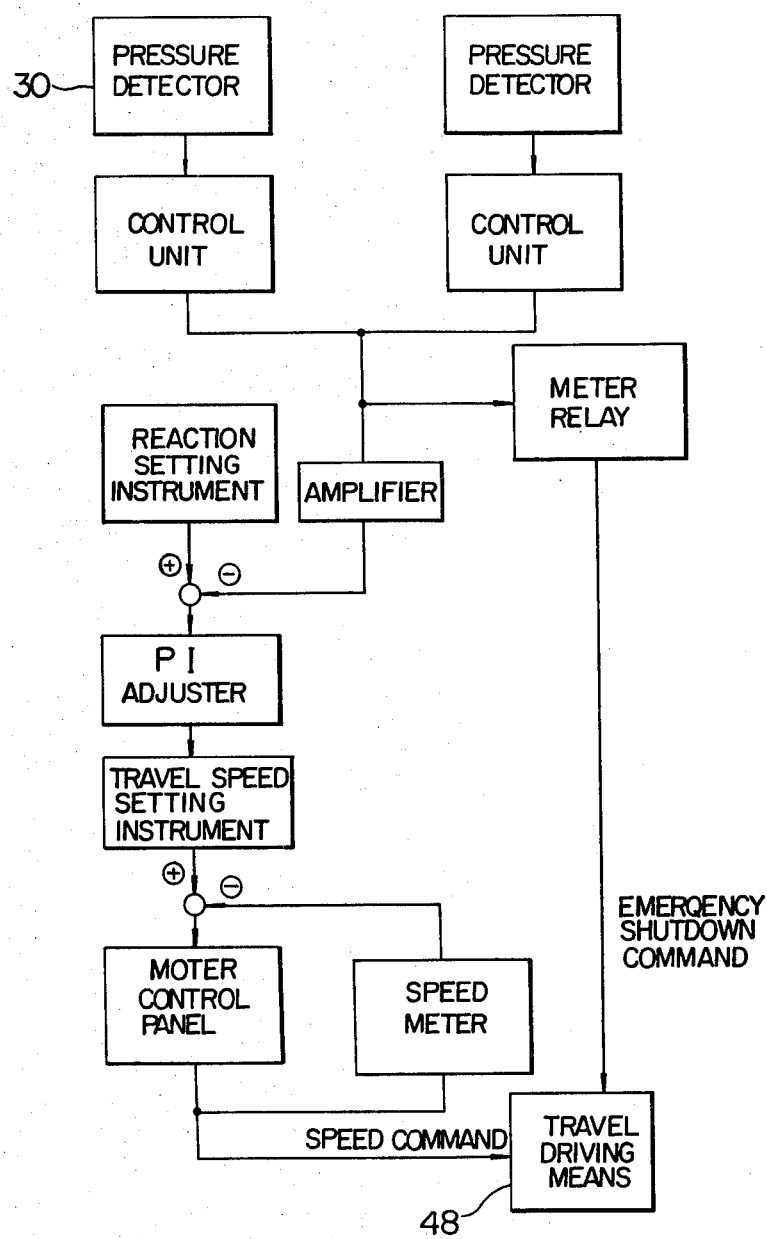
FIG. 15 is a block diagram showing the control system.

FIG. 15 is a block diagram showing the travel speed control system in the collector according to the present invention. Same reference numerals as shown in FIGS. 11 through 14 are used to designate same or similar parts. Namely, the pressure detector 30, the travel driving means 48 and the like are electrically, controllably connected to one another in the interrelationship shown in FIG. 15 through corresponding control devices housed in a control panel 49 shown in said FIG. 11.

With the arrangement described above, action will hereunder be described. First, in FIG. 11, when the chain 16 installed with buckets 15 is turned by the rotary mechanism 34, the chain 16 collect the precipitate 50 accumulated in the sedimentation basin 1 and discharges same on to the mounted conveyor 5 through the chute 7. The whole collector travels in the arrow-marked direction while collecting said precipitate 50, and it is necessary to adjust the travel speed and the position of the rake wheel 24 provided at the lower end portion of the elevating frame 9, respectively, in proportion to the volume of the precipitate 50 accumulated. Said adjustments are to be effected by signals sent out from the pressure detector 30 interposedly provided between the machine frame 28 and the elevating frame 9, the details of which will be described hereinafter. Additionally, the elevation of elevating frame 9 is effected by the rack 31 through the rotation of the pinion 32 which is driven by the elevating means 10. On the other hand, the elevation of said elevating frame 9 causes the chain 16 to be slackened. Therefore, the chain 16 is needed to be stretched. In this case, when the wire winding drum 38 is driven by the electric motor 39, the wire rope 37 is wound up so that the tension wheel 11 coaxially provided with the sheave 35 is moved leftward. Additionally, the tension wheel 11, 11 are connected to each other by a wire rope 41 wound in a letter 'U' shaped turn through the sheave 40, and therefore, the leftward movement of said tension wheel 11 causes the rightward movement of the other tension wheel 11 so that the chain 16 installed with the buckets 15 is maintained in a stretched condition, thereby eliminating problems in collecting the precipitate 50.

Figure 11:
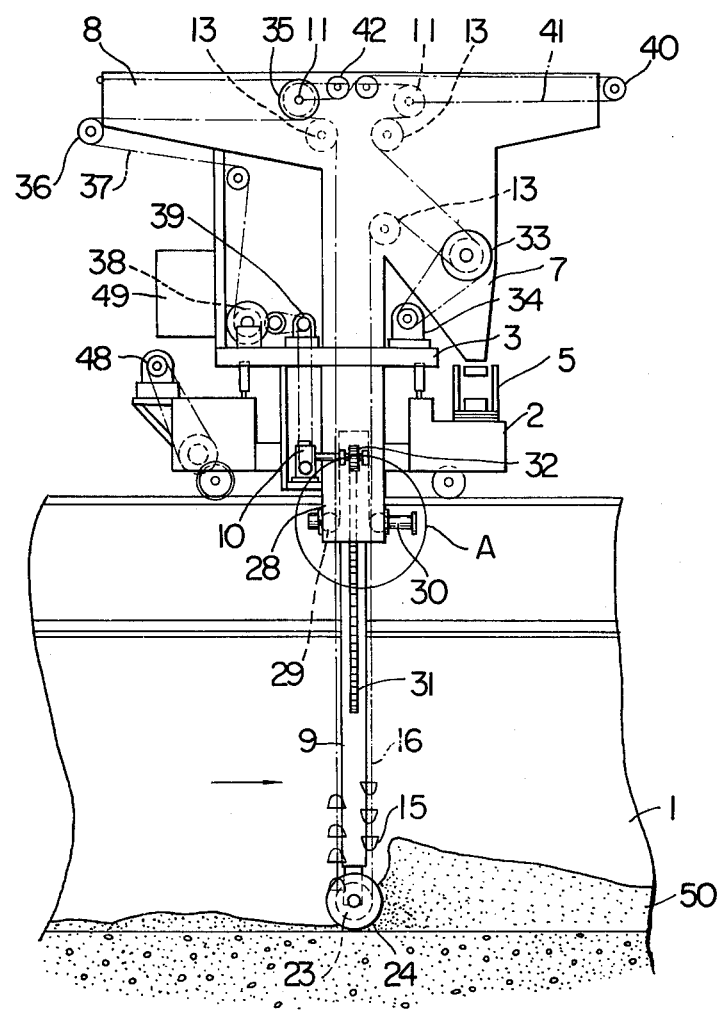
FIG. 11 is a general side view showing the second embodiment of the present invention.

Next, the bending moment acting on the elevating frame 9 is varied in proportion to the volume of the precipitate 50 accumulated at the bottom of sedimentation basin 1 with the result that a load is also varied which acts on the pressure detecting element 44 through the guide roller 46 and the roller support fitting 45 that are intervenedly provided between the elevating frame 9 and the machine frame 28 in FIGS. 12 through 14. Since the pressure detecting element 44 is constantly urged toward the elevating frame 9 through the agency of the spring 47 as shown in FIG. 14, the transmission of load is secured irrespective of the position the elevating frame 9. On the other hand, said pressure detector 30 and the travel driving means 48 are electrically, controllably connected to each other as shown in FIG. 15. Referring to FIG. 15, a reaction setting signal corresponding to an unloading normal travelling collection speed of the collector according to the present invention is previously fed to a reaction setting instrument. In the case a signal sent out from the pressure detector 30 is 0, the signal to be fed to a travel speed setting instrument has the same value as that of said reaction setting signal because the input to be fed to a PI adjuster from said reaction setting instrument is limited to the reaction setting signal which had been previously fed to said setting instrument. Consequently, the speed command from the motor control panel corresponds to said normal travelling speed so that the travel driving means 48 is operated in the unloading normal condition. Next, in the case that the volume of precipitate 50 accumulated at the bottom of sedimentation basin 1 is large as shown in FIG. 11, a load corresponding to the volume of accumulated precipitate 50 acts on the pressure detector 30 through the elevating frame 9. Consequently, in FIG. 15, a reaction signal from the pressure detector 30 passes through a control unit and an amplifier where it is amplified, and is fed to the PI adjuster. Since the reaction setting signal has been previously fed to the PI adjuster as aforesaid, a signal representing the difference between said reaction setting signal and the reaction signal from the pressure detector 30 is fed to the travel speed setting instrument, thus causing the motor control panel to send out a speed command corresponding to the load for actuating the travel driving means 48. Thus, the collection travel speed of the collector is increased or decreased in proportion to the volume of precipitate 50 accumulated in the sedimentation basin 1. FIG. 11 shows the case where the pressure detector 30 is provided at one side of the machine frame with respect to the travelling direction. If pressure detector 30 are provided at the front and back side of the machine frame 28 as shown in FIG. 13, it is possible to control the travel speed in proportion to the volume of precipitate 50 accumulated irrespective of the travelling direction of the collector. Additionally, a signal corresponding to the maximum reaction force can be previously fed to a meter relay so that, in case the reaction signal detected by the pressure detector 30 exceeds said maximum reaction signal, an emergency shutdown command is sent out to the travel driving means 48, thus shutting down the whole collector travelling. In addition, the travel speed of the collector is fed back to the motor control panel by a signal from 2 speed meter (not shown in FIG. 11) and controlled upon the comparison of said signal with a signal from the travel speed setting instrument.

Figure 16:
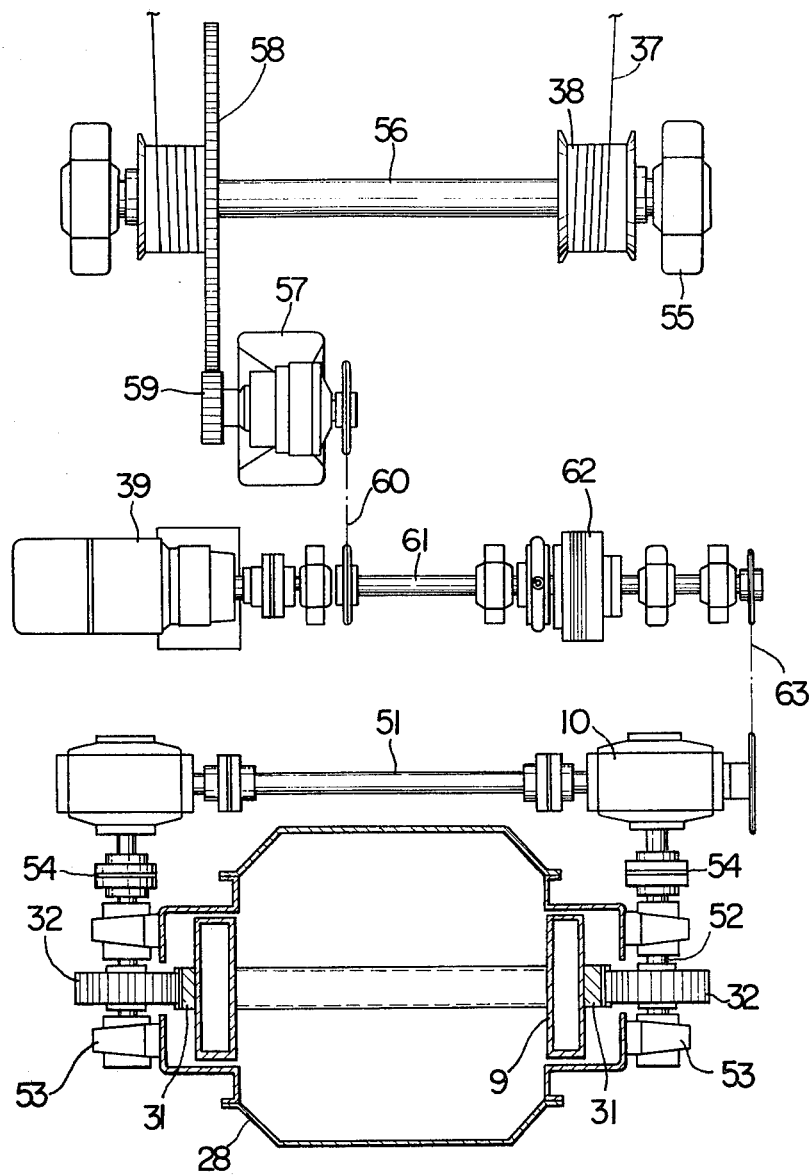
FIGS. 16 through 18 are respectively cross-sectional plan views with essential portions being enlarged, showing the third through fifth embodiments of the present invention.

FIG. 16 is a cross-sectional plan view with essential portions being enlarged, showing the third embodiment of the present invention. Same reference numerals as shown in said FIGS. 11 through 14 are used to designate same or similar parts. Referring to FIG. 16, right and left elevating means 10 of the elevating frame 9 are interlockingly connected to each other through a shaft 51. A shaft 52 fixedly provided with the pinion 32 is supported by a bearing 53. Said shaft 52 is connected to the elevating means 10 through a shaft coupling 54. Next, the wire winding drum 38 is solidly secured to the opposite end portions of a shaft 56 supported through a bearing 55, and the shaft 56 and a reduction gear 57 are connected to each other through gears 58, 59. The electric motor 39 and said reduction gear 57 are connected to each other through power transmitting means 60. Next, a shaft 61 directly connected to the electric motor 39 is provided with a friction clutch 62, and said shaft 61 and the elevating means 10 are connected to each other through power transmitting means 63.

With the arrangement described above, action will hereunder be described. As described above, to prevent the chain 16 shown in FIG. 11 from being slackened, the wire winding drum 38 is actuated upon the ascent or descent of the elevating frame 9. In FIG. 16, the elevating means 10 and the electric motor 39 are connected to each other through power transmitting means 63, friction clutch 62 and shaft 61, and the wire winding drum 38 and said electric motor 39 are connected through the shaft 56, gears 58, 59, reduction gear 57 and power transmitting means 60 so that the ascent or descent of the elevating frame 9 and the driving of the wire winding drum 38 can be carried out simultaneously. For example, in order for that only the chain 16 shown in FIG. 11 is slackened in the condition where the elevating frame 9 is elevated to the uppermost end, the power transmission system between the electric motor 39 and the elevating means 10 should be interrupted. This is particularly effective at the time when said chain 16 or buckets 15 are subjected to inspection, repair or the like. Additionally, slackened chain 16 may cause the friction clutch to slip. In that case, referring to FIG. 11, only the wire winding drum 38 is driven by the electric motor 39, and the tension wheels 11, 11 are moved horizontally until the chain 16 is engaged with the chain wheel 23. After the engagement of the chain 16 with the chain wheel 23, the slipping condition of the friction clutch disappears, and the elevating means 10 is driven in synchronism.

Figure 17:
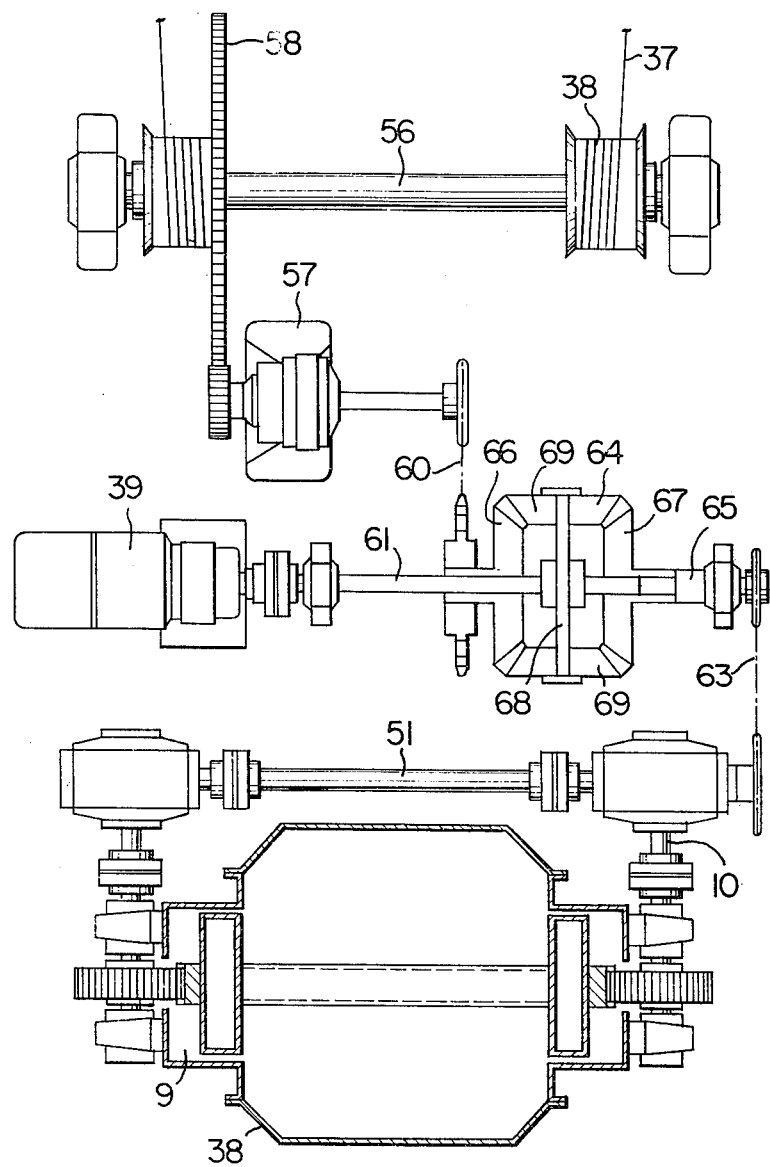

FIG. 17 is a cross-sectional view with essential portions being enlarged, showing the fourth embodiment of the present invention, wherein differential gears 64 are interposedly provided in place of the friction clutch 62 shown in FIG. 16. Namely, a shaft 65 is relatively rotatably connected to a shaft 61, a bevel gear 66 is rotatably, loosely coupled onto said shaft 61, and a bevel gear 67 having teeth identical in number with that of said bevel gear 66 is fixed on said shaft 65. The shaft 61 is projectingly, fixedly provided with arm 68 in a manner said arm 68 intersects perpendicularly to said shaft 61, and bevel gears 69 are fixed on the opposite end portions of said arm 68, respectively, interposed between and brought into meshing engagement with said bevel gears 66, 67. On the other hand, the power transmitting means 60 is connected to the bevel gear 66, and the power transmitting means 63 is to the shaft 65. It should be understood, however, that there is no intention to limit the arrangement to the one comprising bevel gears only, but on the contrary, the arrangement can comprise gears of other types as far as the shafts 61 and 65 are relatively rotatable with each other.

With the arrangement described above, it becomes possible that the wire winding drum 38 and the elevating means 10 be driven in synchronism and one of the two be driven with the other being stopped.

Figure 18:
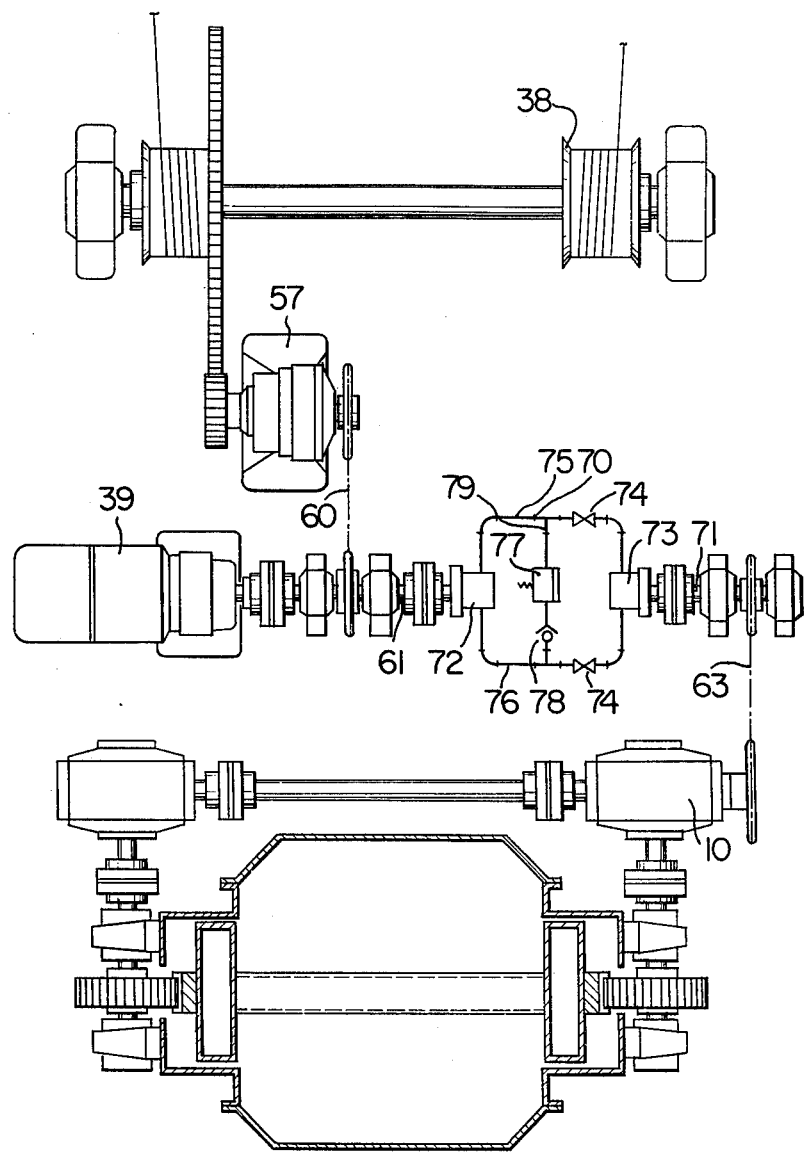

FIG. 18 is a cross-sectional plan view with essential portions being enlarged, showing the fifth embodiment of the present invention, wherein a hydraulic motor device 70 is provided on the shaft 61 in place of the friction clutch 62 and differential gears 64 shown in FIGS. 16 and 17, respectively. Referring to FIG. 18, a shaft 71 is provided, being rotatable independently of the shaft 61. A hydraulic pump 72 and a hydraulic motor 73 are fixed on the shafts 61 and 71, respectively. The discharge port of hydraulic pump 72 and the intake port of hydraulic motor 73 are connected to each other through pipes 75, 76 interposedly provided with sluice valves 74, respectively. Said pipes 75 and 76 are connected to each other through a pipe 79 interposedly installed with a relief valve 77 and a check valve 78 in series. The shaft 71 is connected to the elevating means 10 through the power transmitting means 63.

This embodiment is equal to the preceding embodiment in respect of that the wire winding drum 38 and elevating means 10 can be driven in synchronism and one of the two can be driven with the other being stopped with the arrangement described above. In the preceding embodiment, the collector wherein an electric motor is used as driving means. However, it is natural that not only an electric motor but also other power generating means such as a hydraulic motor, internal combustion engine and the like should be suited as the driving means. Additionally, in the embodiment shown in FIG. 18, fluid pressure motors including a pneumatic one can be used in addition to the hydraulic motor, and moreover, the control of flowing direction and pressure of fluid can naturally be effected by fluid control means in addition to valves. Further, the wire rope constituting the stretching means for the tension wheels can be broadly used as a medium for winding round in place of a chain and the like, and the power transmitting means from the driving means are not limited to a chain device only. Additionally, in FIG. 16, such an embodiment has been shown that the friction clutch provided on the driving means is interposed between the driving means and the elevating means so that only the stretching means for the tension wheels can be driven by the wire winding drum. However, the function remains all the same which allows only the chain to be rotated at the time of maintenance, inspection, repair or the like, even if the disengaging means such as said friction clutch is interposed between the driving means and the wire winding drum so that only the elevating means can be driven.

The travelling precipitate collector according to the present invention has the arrangement and action described above, and hence, can present the following effects.

(1) The space between the chain wheel and the rake wheel that are provided at the lower end portion of the elevating frame can be made satisfactorily large and a scraper is projectingly provided therebetween so that the precipitate can be prevented from clinging and smooth engagement between the chain and chain wheel can be secured.

(2) The outer end face of rake wheel is wide open so that the intervention or intrusion of the precipitate can be extremely limited and both the chain wheel and rake wheel can be very smoothly rotated.

(3) The lower end portion of elevating frame is open so that the works of disassembly, inspection and maintenance of the chain wheel can be made very easily, thereby sharply improving the operation efficiency of the collector.

(4) The intrusion and intervention of the precipitate is prevented so that no excessive load acts on the elevating frame and hence no excessively large bending mount is applied to the collector.

(5) Even if the volume of precipitate accumulated varies from place to place, the load can be previously detected by the pressure detector installed on the elevating frame to automatically control the travel speed so that an unusual bending moment can be prevented from acting on the elevating frame, thereby enabling to prevent the longitudinally travelling frame body from moving in a zigzag direction due to the unbalanced load.

(6) The elevating means for the elevating frame and the stretching means for the chain can be driven by one and the same driving means so that the driving speeds of the two can be synchronized, operation can be made very easy, the whole collector can be rendered compact in size, thereby enabling to reduce the installation area to a considerable extent.

What is claimed is:

1. A travelling precipitate collector which comprises a longitudinally travelling frame body capable of travelling over a plurality of sedimentation basins, a transversely travelling frame body capable of travelling on said longitudinally travelling frame body, an elevating frame vertically movably provided in a machine frame fixed on said transversely travelling frame body, said elevating frame capable of having a bending moment as the collector collects precipitate which varies in proportion to the volume of the precipitate accumulated at the bottom of a sedimentation basin, a chain rotatably provided which is capable of circulating through said machine frame and the elevating machine, a plurality of buckets fixedly provided on the chain, at least one pressure detector provided in a portion of said machine frame so as to abut against said elevating frame through urging means, transversely travelling drive means for causing said transversely travelling frame body to travel, and control means, responsive to said pressure detector, for controlling the speed at which said transversely travelling drive means causes said transversely travelling frame body to travel, whereby variation of the bending moment of said elevating frame is detected by means of said detector and travelling speed of said transversely travelling frame body is controlled responsive to this variation.

2. A travelling precipitate collector as claimed in claim 1 further including tension wheel stretching means and elevating means for said elevating frame that are to be engaged with said chain are provided on said machine frame, respectively, and said stretching means and elevating means are connected to common driving means.

3. A travelling precipitate collector as claimed in claim 1 in which chain support means are projectingly provided at the lower end portion of the elevating frame, support bearings are projectingly provided at the lower end of elevating frame and are provided with a rotating shaft, said rotating shaft is formed to project outwardly of said support bearings, a pair of chain wheels engageable with the chains and a pair of rake wheels are fixed on the projecting portions of said rotating shaft successively toward the ends of the shaft, and a scraper projecting from the lower end of said elevating frame is interposed between the chain wheel and the rake wheel.

4. A travelling precipitate collector as claimed in claim 1, having tension wheel stretching means and elevating means for said elevating frame; also having driving means for driving both the stretching means and elevating means, said driving means including a power transmitting device having two relatively rotatable shafts provided in one portion of the driving means as a component, whereby either one of the stretching means or elevating means can be separately driven.

5. A travelling precipitate collector as claimed in claim 4 in which the power transmitting device includes a friction clutch.

6. A travelling precipitate collector as claimed in claim 4 in which the power transmitting device includes differential gears.

7. A travelling precipitate collector as claimed in claim 4 in which the power transmitting device includes a fluid pressure motor device capable of controlling the flowing direction of fluid.

8. A travelling precipitate collector as claimed in claim 1, having tension wheel stretching means and elevating means for said elevating frame; also having driving means for driving both the stretching means and elevating means, said driving means including a power transmitting device having two relatively rotatable shafts provided in a portion of the driving means as a component, whereby the stretching means and the elevating means can be driven synchronously.

9. A travelling precipitate collector as claimed in claim 8 in which the power transmitting device includes a friction clutch.

10. A travelling precipitate collector as claimed in claim 8 in which the power transmitting device includes differential gears.

11. A travelling precipitate collector as claimed in claim 8 in which the power transmitting device includes a fluid pressure motor device capable of controlling the flowing direction of fluid.

12. A travelling precipitate collector as claimed in claim 2 in which chain support means are projectingly provided at the lower end portion of the elevating frame, support bearings are projectingly provided at the lower end of the elevating frame and are provided with a rotating shaft, said rotating shaft is formed to project outwardly of said support bearings, a pair of chain wheels engageable with the chains and a pair of rake wheels are fixed on the projecting portions of said rotating shaft successively toward the ends of the shaft, and a scraper projecting from the lower end of elevating frame is interposed between the chain wheel and the rake wheel.

13. A travelling precipitate collector as claimed in claim 2, said driving means including a power transmitting device having two relatively rotatable shafts provided in a portion of the driving means as a component, whereby either one of the stretching means or elevating means can be separately driven.

14. A travelling precipitate collector as claimed in claim 3, having tension wheel stretching means and elevating means for said elevating frame; also having driving means for driving both the stretching means and elevating means, said driving means including a power transmitting device having two relatively rotatable shafts provided in a portion of the driving means as a component, whereby either one of the stretching means or elevating means can be separately driven.

15. A travelling precipitate collector as claimed in claim 2, said driving means including a power transmitting device having two relatively rotatable shafts provided in a portion of the driving means as a component, whereby the stretching means and the elevating means can be driven synchronously.

16. A travelling precipitate collector as claimed in claim 3, having tension wheel stretching means and elevating means for said elevating frame; also having driving means for driving both the stretching means and elevating means, said driving means including a power transmitting device having two relatively rotatable shafts provided in a portion of the driving means as a component, whereby the stretching means and the elevating means can be driven synchronously.

17. A travelling precipitate collector as claimed in claim 1, wherein said at least one pressure detector is secured to said machine frame and comprises a pressure detecting element and a spring urging said pressure detecting element against said elevating frame.

18. A travelling precipitate collector as claimed in claim 1, wherein said machine frame has both a back side and a front side with respect to the direction in which said machine frame travels, and wherein at least one pressure detector is positioned on both the front side and back side of said machine frame, whereby the travel speed can be controlled irrespective of the travelling direction of the collector.

19. A travelling precipitate collector as claimed in claim 1, having tension wheels for maintaining said chain in a stretched condition, said tension wheels having tension wheel stretching means attached thereto for moving said tension wheels horizontally for maintaining said chain in a stretched condition, and elevating means for said elevating frame, said tension wheels, said stretching means, and said elevating means provided on said machine frame, and said stretching means and elevating means are connected to a common driving means.

20. A travelling precipitate collector as claimed in claim 19, wherein said common driving means has a power transmitting device for transmitting power to the stretching means and a power transmitting device for transmitting power to the elevating means, whereby the power transmitting devices can transmit power either separately or synchronously such that said stretching means and elevating means can be either separately or synchronously driven.

21. A travelling precipitate collector as claimed in claim 20, wherein at least one of the power transmitting devices includes a friction clutch to permit the stretching means and elevating means to be either separately or synchronously driven.

22. A travelling precipitate collector as claimed in claim 20, wherein at least one of the power transmitting devices includes differential gears to permit the stretching means and elevating means to be either separately or synchronously driven.

23. A travelling precipitate collector as claimed in claim 20, wherein at least one of the power transmitting devices includes a fluid pressure motor device capable of controlling the flowing direction of fluid, which motor device permits the stretching means and elevating means to be either separately or synchronously driven.

* * * * *